United States Patent
Wang et al.

(10) Patent No.: US 10,634,205 B2
(45) Date of Patent: Apr. 28, 2020

(54) ULTRA-LOW FREQUENCY TUNED LIQUID MASS DAMPER AND DESIGN METHOD OF THE SAME

(71) Applicants: CHINA RAILWAY BRIDGE SCIENCE RESEARCH INSTITUTE, LTD., Wuhan, Hubei (CN); CHINA RAILWAY MAJOR BRIDGE ENGINEERING GROUP CO., LTD, Wuhan, Hubei (CN)

(72) Inventors: Zhengxing Wang, Hubei (CN); Xiaopeng Chai, Hubei (CN); Hongping Zhu, Hubei (CN); Bo Wang, Hubei (CN); Guoqiang Jing, Hubei (CN); Pengfei Liu, Hubei (CN); Chong Li, Hubei (CN); He Huang, Hubei (CN); Changfei Ma, Hubei (CN); Xiaobo Wu, Hubei (CN); Qi Yin, Hubei (CN); Nengjun Sheng, Hubei (CN); Jiang Lyu, Hubei (CN); Shifeng Zhu, Hubei (CN); Hanwei Zhang, Hubei (CN)

(73) Assignees: CHINA RAILWAY BRIDGE SCIENCE RESEARCH INSTITUTE, L, Wuhan, Hubei (CN); CHINA RAILWAY MAJOR BRIDGE ENGINEERING GROUP CO., Wuhan, Hubei (CN)

(*) Notice: Subject to any disclaimer, the term of this patent is extended or adjusted under 35 U.S.C. 154(b) by 15 days.

(21) Appl. No.: 16/077,734

(22) PCT Filed: Sep. 27, 2017

(86) PCT No.: PCT/CN2017/103629
§ 371 (c)(1),
(2) Date: Aug. 13, 2018

(87) PCT Pub. No.: WO2018/196276
PCT Pub. Date: Nov. 1, 2018

(65) Prior Publication Data
US 2019/0249740 A1    Aug. 15, 2019

(51) Int. Cl.
*F16F 7/104* (2006.01)
*E01D 19/00* (2006.01)
*E04B 1/98* (2006.01)

(52) U.S. Cl.
CPC ............ *F16F 7/104* (2013.01); *E01D 19/00* (2013.01); *E04B 1/985* (2013.01)

(58) Field of Classification Search
CPC ........... F16F 7/104; F16F 15/04; E01D 19/00; B60G 13/16; E04B 1/985
(Continued)

(56) References Cited

U.S. PATENT DOCUMENTS

| 7,568,565 B2 * | 8/2009 | McFarland | F16F 7/104 188/380 |
| 2014/0202812 A1 * | 7/2014 | Hauf | F16F 7/1011 188/380 |
| 2016/0069409 A1 * | 3/2016 | McGranahan | F16F 9/34 188/380 |

FOREIGN PATENT DOCUMENTS

| CN | 203626078 U | * | 6/2014 | |
| WO | WO-9402755 A1 | * | 2/1994 | ............. B60G 13/16 |

OTHER PUBLICATIONS

English translation of CN203626078 (Year: 2014).*

* cited by examiner

*Primary Examiner* — Melanie Torres Williams
(74) *Attorney, Agent, or Firm* — Chun-Ming Shih; Lanway IPR Services

(57) ABSTRACT

The present invention discloses an ultra-low frequency (ULF) tuned liquid mass damper, and relates to the technical field of bridge vibration control. The tuned damper includes a damping box which is provided with a spring set secured at one end to the damping box, the other end connected with a mass block. The damping box is filled with damping
(Continued)

liquid, and the mass block is completely immersed or partially immersed in the damping liquid. The damping ratio of the ULF tuned liquid mass damper ranges from 3% to 35%, and the inherent frequency 0.05 to 0.5 Hz. The ULF tuned liquid mass damper, according to the present invention, can fully utilize the additional mass of the damping liquid, and with the buoyancy effect of the liquid, maintain the frequency of structural vibration below 0.5 Hz while significantly reduce the spring static elongation, as well as the damper spring consumption and the installation space to meet the limitations on the installation space for dampers under actual construction circumstances.

11 Claims, 4 Drawing Sheets

(58) Field of Classification Search
USPC .................................................. 188/379–380
See application file for complete search history.

ULTRA-LOW FREQUENCY TUNED LIQUID MASS DAMPER AND DESIGN METHOD OF THE SAME

TECHNICAL FIELD

The present invention relates to a technical field of bridge vibration control, specifically an ultra-low frequency (ULF) tuned liquid mass damper and design method of the same.

BACKGROUND ART

Bridge structures tend to vibrate under loads from the outside wind and vehicles, resulting in discomfort vehicles and pedestrians, accumulating fatigue damages to and shorter lifetime of the bridge even collapses of the bridge structures. For example, Tacoma Narrows Bridge in the United States collapsed under the induction of wind loads. Whether a bridge will vibrate sharply or not relates to the ratio of the induction frequency of external loads and the natural vibration frequency of the bridge. When these two frequencies are close to each other, the bridge structure will resonate in the mode corresponding to the natural vibration frequency. The tuned mass damper (TMD) functions to adjust the damper frequency to make it close to the controlled frequency of the bridge structure (i.e. the vibration frequency to put the bridge under control), enable the active mass in the damper to vibrate at a larger amplitude than the displacement of the bridge structure to transfer its vibration energy, while dissipate the energy transmitted to the damper by its interior damping energy dissipation device for the ultimate purpose of suppressing the vibration of the bridge structure. For the controlled mode of the bridge structure, the tuned damper increases its modal damping to maintain a low amplitude vibratory response to continuous external inductions while make the structural vibratory response can be attenuate rapidly after external inductions disappear.

As the bridge span increases, the natural vibration frequency of the bridge structure gradually decreases. For example, the controlled frequency of non-navigable beam bridge of Hong Kong-Zhuhai-Macao Bridge is 0.33 Hz approximately. However, the main beam of the suspension bridge or the cable-stayed bridge has a lower vertical vibration frequency; Xihoumen Bridge for example, with level 1 to 10 vertical vortex frequency of the main beam ranging from 0.079 Hz to 0.374 Hz. And based on the on-site measurements, the vortex induced vibration of the main beam has a frequency around 0.23 Hz to 0.32 Hz even if the beam is under a high-level vertical bending mode. All these vibrations can be effectively suppressed by using the TMD theory. But for the damper to exert a tuned damping effect, the damper frequency must be as low as the frequency just mentioned.

The main challenges for the conventional TMD to achieve ULF are insufficient stiffness of springs, along with the dead weight of the mass block which is hard to balance. If the gravity of the mass block is directly balanced by the spring elasticity only, the static elongation of the spring shall be:

$$\delta = \frac{mg}{k} = \frac{mg}{m(2\pi f)^2} = \frac{g}{(2\pi f)^2} \quad (1)$$

wherein δ is the spring static elongation (in m); m, the mass of the mass block (in kg); k, the spring stiffness (in N/m); g, the gravitational acceleration (in m/s2); and f, the damper frequency (in Hz). The formula above indicates that the spring static elongation (δ) is inversely proportional to the squared frequency (f), and as the frequency decreases, the spring static elongation increases rapidly, so does the space occupied by the vibration absorber and its mass. To achieve such elongation and ensure the stress of the spring wire conforms to the requirements of design specifications, the diameter and the total length of the spring wire shall also increase rapidly, raising the spring's mass in no time. The table below shows the corresponding relations among the frequency, the spring static deformation and the spring mass ratio (spring mass/block mass) when the damper is under ULF condition.

TABLE 1

Corresponding relations among frequency, spring static deformation and spring mass ratio when conventional TMD is under ULF

| Conventional TMD frequency (Hz) | Spring static elongation (m) | Spring mass/ block mass |
| --- | --- | --- |
| 0.5 | 0.99 | 19% |
| 0.4 | 1.55 | 24% |
| 0.3 | 2.76 | 52% |
| 0.2 | 6.21 | 101% |
| 0.1 | 24.82 | 250% |

Note:
the spring design stress [σ] = 370 MPa.

According to the table above, the length and the mass of the spring will increase rapidly with the required frequency declines. For a conventional TMD, it's difficult to reach the natural vibration frequency between 0.3 Hz and 0.5 Hz, let alone a value below 0.3 Hz.

To address those issues, as shown in FIG. 1, Tokyo Bay Bridge employs a lever-type TMD to implement a damper with frequency of 0.33 Hz by utilizing the 5-time magnifying effect of the lever to reduce the spring static compression by 5 times which changes the original spring deformation from 2.28 m to 0.46 m. With this solution, the installation space can be reduced through lever switching, however disadvantages ensued are as follows:

1. The spring consumption can barely be reduced, while the damper needs a complicated lever-based transmission system with a sophisticated structure, which is highly demanding for manufacturing accuracy and field assembly. And the materials without damping effects, such as bearings, brackets, levers and hinge joints, substantially increase the cost for vibration reduction.

2. It's hard to make the frequency even lower, and considering the damper needs a complicated lever-based transmission system, more rotary hinges brings more rotational frictions from the bearings, which gives a greater initial damping to the damper and makes it insensitive to small amplitudes. And in this case, it is also hard to optimize the parameters of the damper. In conclusion, it is very difficult for such solution to be promoted and applied to structural vibration control with requirements on lower frequency.

SUMMARY

For the defects existing in the prior art, the object of the present invention is to provide a ultra-low frequency tuned liquid mass damper which can maintain the frequency of structural vibration below 0.5 Hz while significantly reduce the spring static elongation, as well as the damper spring consumption and the installation space to meet the limitations on the installation space for dampers under actual construction circumstances.

To achieve the object above, the present invention is implemented by the following technical solution:

An ultra-low frequency (ULF) tuned liquid mass damper comprises:

a damping box which is provided with a spring set secured at one end to the damping box, the other end connected with a mass block; the damping box is filled with damping fluid, and the mass block is completely immersed or partially immersed in the damping liquid, the damping ratio of the ULF tuned liquid mass damper ranges from 3% to 35%, and the inherent frequency 0.05 to 0.5 Hz.

Based on the above technical solution, the upper portion of the damping box which is fixed with a connecting plate; the spring set is secured to the connecting plate.

Based on the above technical solution, the spring set which comprises first spring group located above the mass block and a second spring group opposite to the first spring group and located below the mass block, the second spring group has one end connected to the bottom plate of the damping box.

Based on the above technical solution, the spring set which is designed as cylindrical spiral extension spring or cylindrical spiral compression spring; the spring set is uniformly fixed above the mass block, or oppositely mounted to the top and the bottom of the mass block.

Based on the above technical solution, the mass block is a solid structure or a hollow one.

Based on the above technical solution, the mass block which has an overflow hole; the overflow hole is a through hole with its opening direction consistent with the axis of the spring set.

Based on the above technical solution, the mass block is a streamlined body or a bluff body.

Based on the above technical solution, the mass block which is provided with at least one set of flaps extending outwardly from the mass block. Each flap set comprises two flaps disposed on opposite sides of the mass block.

A design method of The ULF tuned liquid mass damper, comprises the steps of:

Step 1: based on the vibration reduction goal, determining the mass (m) of the active mass block of the ULF tuned liquid mass damper, the target frequency (f) and the target damping ratio (ξ);

Step 2: based on the amplitude and the space requirements of the ULF tuned liquid mass damper, determining the static deformation (δ) of the spring;

Step 3: based on the target damping ratio (ξ), determining the shape of the mass block initially;

Step 4: based on the shape of the mass block and the frequency (f) test, determining the additional liquid mass (δm);

Step 5: based on the formula, $k=(2\pi f)2\cdot(m+\delta m)$, determining the stiffness (k) of the spring set;

Step 6: based on the formula, $m\cdot g=\rho\cdot g\cdot V+k\cdot \delta$, determining the equivalent density of the mass block;

Step 7: measuring the frequency of the damper, and for a large deviation, adjusting it by changing the spring stiffness (k), and for a small one, adjusting it by changing the mass or the equivalent density of the mass block to achieve the required frequency (f) and static deformation (δ);

Step 8: measuring the damping ratio of the damper, and changing the shape or the clearance of the mass block to adjust the damping ratio when a deviation occurs;

Step 9: repeating step 7 and step 8 until both the frequency and the damping ratio meet the requirements.

Based on the above technical solution, step 3 requires a bluff-body mass block with a large damping coefficient (CD) when the damping ratio (ξ) is large; or a streamline-body mass block with a small damping coefficient (CD) when the damping ration (ξ) is small.

Compared to the prior art, the present invention has advantages as follows:

(1) The ULF tuned liquid mass damper, according to the present invention, can fully utilize the additional mass of the damping liquid, and with the buoyancy effect of the liquid, maintain the frequency of structural vibration below 0.5 Hz while significantly reduce the spring static elongation, as well as the damper spring consumption and the installation space to meet the limitations on the installation space for dampers under actual construction circumstances and improve the price-performance of vibration damping devices.

(2) The ULF tuned liquid mass damper in the present invention increases the spring stiffness by utilizing the additional mass of the damping fluid without changing the design frequency, helping keep the damper stable during movements and avoid problems such as damper tilting and lateral oscillation due to external micro-vibrations.

(3) According to the present invention, it is easy to adjust the damping parameters of the ULF tuned liquid mass damper by changing the shape of the mass block and the flap, and the clearance between the mass block and the damping box. Also, it is easy to meet the requirements on the installation space for bridges on site by adjusting the mass block density, the ratio between the buoyance and the gravity of the mass block, and the spring static elongation.

(4) According to the present invention, the ULF tuned liquid mass damper follows a frictionless constitution, allowing it to be started at slight amplitudes with effective control on small vibrations.

DETAILED DESCRIPTION

The following is the detailed description for the present invention based on drawings and examples.

Example 1

Figure 1:
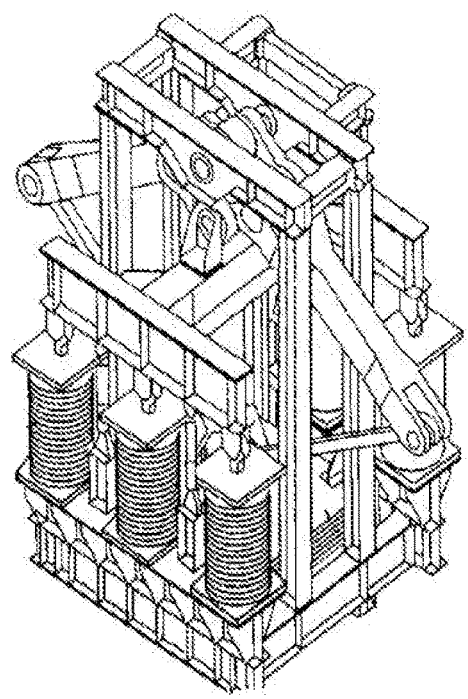
FIG. 1 is the structure diagram of lever-type TMD used in Tokyo Bay Bridge.
Figure 2:
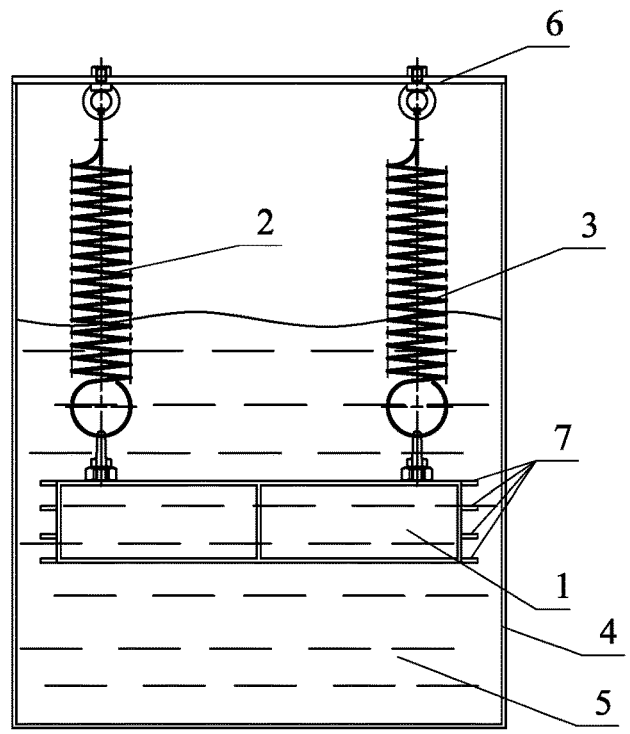
FIG. 2 is the structure diagram of the ULF tuned liquid mass damper in one example based on the present invention.

As shown in FIG. 2, this example for the present invention provides a ULF tuned liquid mass damper, comprising a damping box 4 which is provided with a spring set secured at one end to the damping box 4, the other end connected with a mass block 1; the damping box 4 is filled with damping fluid, and the mass block 1 is completely immersed or partially immersed in the damping liquid 5.

The upper portion of the damping box 4 is fixed with a connecting plate 6; the spring set is secured to the connecting plate 6. This connection method can connect the damper box and the spring set as a whole, better transmit vibrations when they occur, and support a more sufficient damping effect from the damping liquid 5 and the spring set, thereby improving the damping effect of the damper.

It is also available to set flaps 7 on laterals of the block mass with each flap 7 set disposed on the same level perpendicular to the axis of the spring set. With these flaps 7, the effective damping area between the damping liquid 5 and the mass block 1 when the damper absorbs vibration can be increased, the additional mass of the damping fluid 5 further utilized, and the stability of the damping device improved.

The spring set in the damping device is constructed with cylindrical spiral springs which can be selected depending on actual needs. In this example, the spring set consists of two cylindrical spiral extension springs uniformly distributed above the mass.

Example 2

Figure 3:
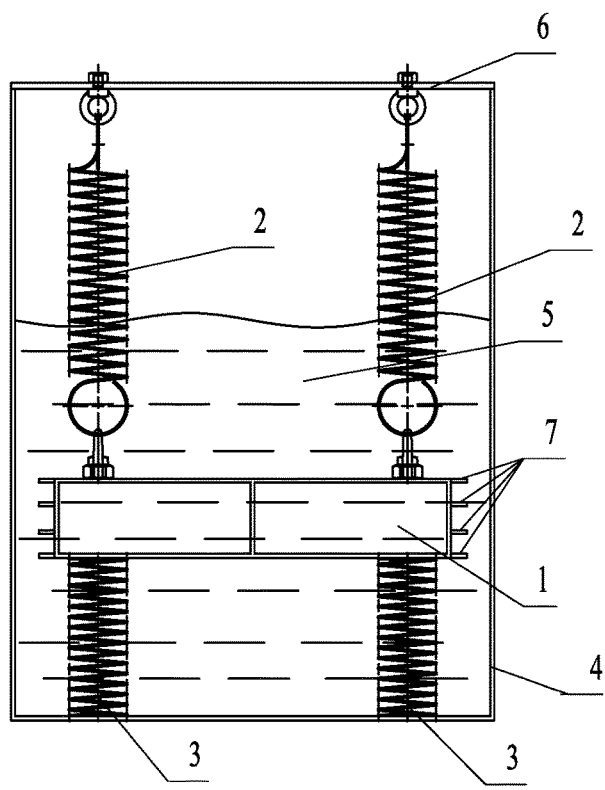
FIG. 3 is the structure diagram of the ULF tuned liquid mass damper in another example based on the present invention.

As shown in FIG. 3, the difference between this example and Example 1 is that the spring set in this example comprises a first spring group 2 located above the mass block 1 and a second spring group 3 opposite to the first and located below the mass block 1. The second spring group 3 has one end connected to the bottom plate of the damping box 4. And the first spring group 2 consists of two cylindrical spiral springs while the second spring group 3 consists of two cylindrical spiral compression springs.

Example 3

Figure 4:
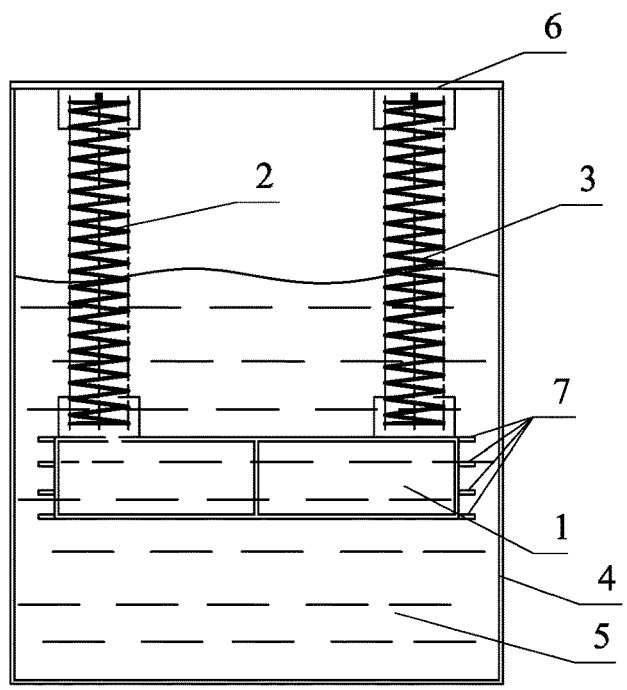
FIG. 4 is the structure diagram of the ULF tuned liquid mass damper in another example based on the present invention.

As shown in FIG. 4, one difference between this example and Example 1 is that the spring set in this example has some small changes to its configuration and fixed structure even if the spring set still consists of two cylindrical spiral extension springs uniformly distributed above the mass; another difference is the mass block 1 in this example has an overflow hole 8, a through hole with its opening direction consistent with the axis of the spring set. This allows the damping liquid 5 to flow through the overflow hole 8 when the mass block 1 moves under vibration, and the damping coefficient of the device can be adjusted by such structure design.

Example 4

Figure 5:
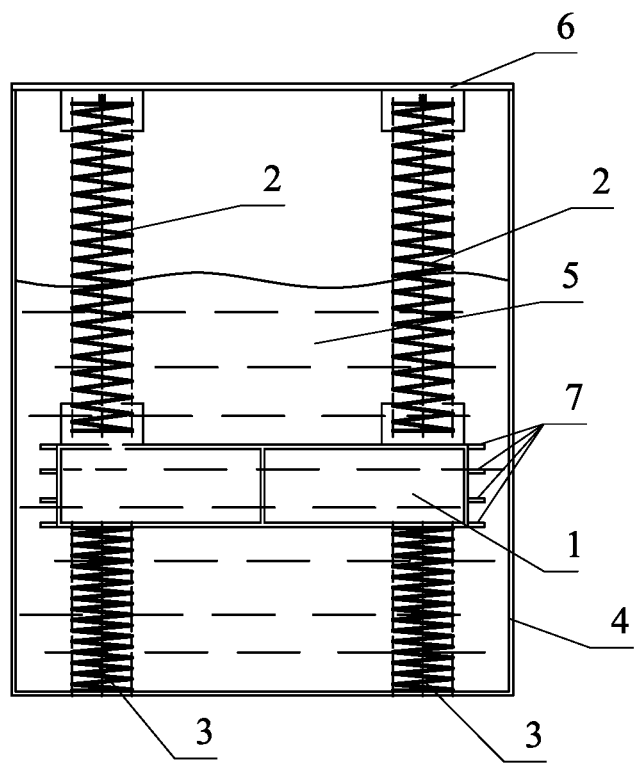
FIG. 5 is the structure diagram of the ULF tuned liquid mass damper in another example based on the present invention.
Figure 6:
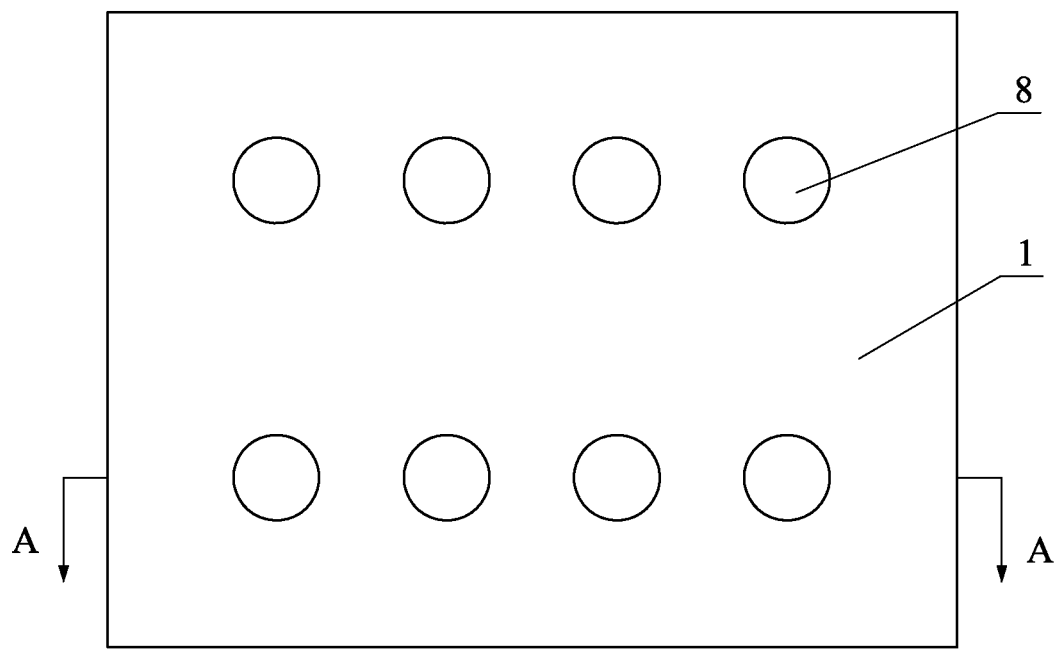
FIG. 6 is the top view of another example based on the present invention.
Figure 7:
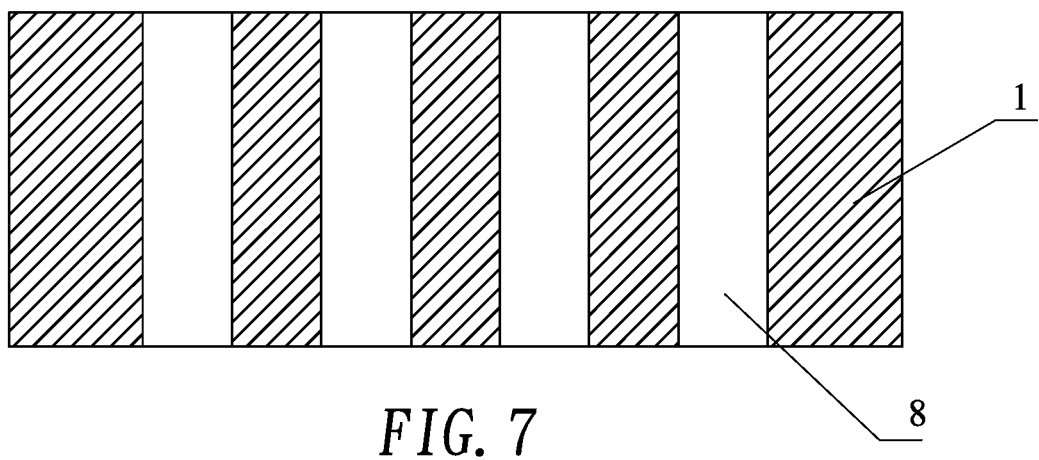
FIG. 7 is the A-A section view of FIG. 6.

As shown in FIG. 5, the difference between this example and Example 1 is that the spring set in this example comprises a first spring group 2 located above the mass block 1 and a second spring group 3 opposite to the first and located below the mass block 1. The second spring group 3 has one end connected to the bottom plate of the damping box 4. And the first spring group 2 and the second spring group 3 respectively consist of cylindrical spiral extension springs oppositely mounted to the top and the bottom of the mass block 1.

According to the present invention, the working principle of the ULF tuned liquid mass damper is described as follows:

When the damper is working, the mass block 1 vibrates up and down in the damping liquid 5, and the mass block 1 moves the damping liquid 5 to vibrate. Due to the fluid-solid coupling effect of the damping liquid 5, an additional liquid mass (δm; which can be up to 2-4 times greater than the m according to both theoretic analysis and test results) is provided for the damper. The δm can be altered by adjusting the mass block 1 and its flap 7 shape, so as to the frequency, f can be adjusted to:

$$f = \frac{1}{2\pi}\sqrt{\frac{k}{m+\delta m}} \quad (2)$$

Seen from the formula above, the frequency of TLMD in the present invention shall decrease significantly when the spring stiffness (k) equals to that of the conventional TMD. And with the differential pressure resistance of the damping liquid 5, the lateral oscillation of the mass block 1 can be constrained, ensuring the stability of the ULF damper during movements.

When the damper is in the static equilibrium position, the mass block 1 shall be balanced by the combined effects from the gravity (m·g), the damping liquid 5 buoyancy (ρ·g·V) and the spring elastic force (K·δ). In this case, the following equation shall apply:

$$m \cdot g = \rho \cdot g \cdot V + k \cdot \delta \quad (3)$$

The derived spring static elongation for the present invention is:

$$\delta = \frac{(m \cdot g - \rho \cdot g \cdot V)}{k} = \frac{(m \cdot g - \rho \cdot g \cdot V)}{(2\pi f)^2 (m + \delta m)} = \frac{g}{(2\pi f)^2}\left[\frac{1}{1+\delta m/m} - \frac{\rho V}{m+\delta m}\right] \quad (4)$$

The spring static elongation for the conventional TMD is:

$$\delta = m \cdot g/k = \frac{g}{(2\pi f)} \quad (5)$$

wherein m is the mass of the active mass block 1; g, gravitational acceleration; ρ, the damping liquid 5 density; V, the damping liquid 5 volume displaced by the active mass; k, total stiffness of the spring set; and δ, the spring static deformation.

Considering the fluid-solid coupling effect of the damping liquid 5, the additional liquid mass (δm) can be up to 4-5 times greater than the m when the f ranges from 0.1 Hz to 0.2 Hz. Seen from the comparison between (4) and (5), the spring static elongation of TLMD in the present invention shall decrease to less than 20% of that of the conventional TMD due to the additional mass effect of the fluid when the frequency of TLMD in the present invention equals to that of the conventional TMD. And if the total spring stiffness k of TLMD in the present invention equals to that of the conventional TMD, the static compression of TLMD in the present invention can be largely reduced. The spring static elongation can be further reduced by adjusting the equivalent density of the mass block 1 and the buoyancy of the damping liquid 5; while by adjusting the ratio of the buoyancy to the spring elastic force, the spring can maintain desired extension (or compression) linearity to address the issue of excessive elongation seen with the conventional TMD.

The damping parameters of the ultra-low frequency TLMD are associated with many other parameters such as the shape of the mass block 1 and the flap 7, the clearance between the mass block 1 and the inner wall of the damping box 4, the frequency and the viscosity coefficient of the damping liquid 5. Among them, 1) the shape of the mass block 1 and the flap 7, along with the clearance between the mass block 1 and the inner wall of the damping box 4, determine the damping coefficient CD when the mass block 1 is moving in the damping liquid 5, which means those with a large damping coefficient have a large resistance, and those with a small damping coefficient have a small resistance. In general, the damping coefficient of a streamlined shape is small while the damping coefficient of a bluff body is large. 2) The damping parameters of ultra-low frequency TLMD are ultimately presented in the form of damping ratio which is related to both the magnitude of damping force and the frequency. Under the same damping force, the damping ratio increases with decreasing frequency. As for the environment where the present invention applies, the inherent frequency of the damper shall be in the range of 0.05 to 0.5 Hz, and the corresponding damping ratio shall be 3% to 35%. 3) The viscosity coefficient of the damping liquid 5 also affects the damping parameters—they increase with the increase of the viscosity coefficient of the damping liquid 5. When selecting the damping liquid 5, those with stable viscosity and temperature characteristics are favorable to ensure that the damping parameters of the ultra-low frequency TLMD remain stable during operation and can be adjusted at the same time.

The present invention follows a friction-free constitution with no mechanical contact and friction between the mass block 1 and the damping box 4, allowing the TLMD to be started at slight amplitudes with effective control on small vibrations. Thus, the vibration can be eliminated before it actually happens. In addition, since there is no need to install a conventional damper device with a complex structure and high cost, and no need to use a complicated lever-based structure, the spring consumption is reduced significantly, thereby greatly improving the price-performance of vibration damping devices.

In addition, the example for the present invention contains a design methodology of the ULF tuned liquid mass damper described as above, including steps as follows:

Step 1: based on the vibration reduction goal, determine the mass (m) of the active mass block 1 of the ULF tuned liquid mass damper, the target frequency (f) and the target damping ratio ($\xi$);

Step 2: based on the amplitude and the space requirements of the ULF tuned liquid mass damper, determine the static deformation ($\delta$) of the spring;

Step 3: based on the target damping ratio ($\xi$), determine the shape of the mass block 1 initially;

Step 4: based on the shape of the mass block 1 and the frequency (f) test, determine the additional liquid mass ($\delta m$);

Step 5: based on the formula, $k=(2\pi f)2\cdot(m+\delta m)$, determine the stiffness (k) of the spring set;

Step 6: based on the formula, $m\cdot g=\rho\cdot g\cdot V+k\cdot \delta$, determine the equivalent density of the mass block 1;

Step 7: actually measure the frequency of the damper, and for a large deviation, adjusting it by changing the spring stiffness (k), and for a small one, adjusting it by changing the mass or the equivalent density of the mass block 1 to achieve the required frequency (f) and static deformation ($\delta$);

Step 8: actually measure the damping ratio of the damper, and changing the shape or the clearance of the mass block 1 to adjust the damping ratio when a deviation occurs;

Step 9: repeat step 7 and step 8 until both the frequency and the damping ratio meet the requirements.

In Step 3, it is available to choose the shape of the mass block 1 depending on actual needs, which follows the principle: select one with a large damping coefficient (CD) when the damping ratio is large; or one with a small damping coefficient (CD) when the damping ration is small.

In step 7, the spring stiffness can be adjusted by changing the outer diameter of the spring, the number of turns, the material and other factors, but typically by replacing the spring to change the outer diameter and the number of turns. Generally, the stiffness is lower with a larger outer diameter and a bigger number of turns.

The following is a description of a specific design case for ultra-low frequency tuned liquid mass dampers:

the object is to design an ultra-low frequency TLMD of which the active mass block 1 is 200 kg, the target frequency is 0.11 Hz, and the target damping ratio is 10%.

The active mass (m) of the damper is designed as 200 kg. Considering the target damping ratio is moderate, the mass block 1 is built into a more conventional hollow-sealed box-shaped steel structure with dimensions of 1,000×650× 272 mm (buoyancy 176.8 kg). Four cylindrical spiral extension springs are used to suspend and fix the mass block 1 on the connecting plate 6 which is secured on the upper portion of the damping box 4. The size of the damping box 4 is 1,200×850×1600 mm, and the connecting plate 6 is fixed with the bridge structure. The total height of the damper is 1.6 m, the height of the damping liquid 5 in the damping box 4 is 1,000 mm, and the mass block 1 is immersed in the damping liquid 5. Considering the additional liquid mass of the damping liquid 5, the total stiffness of the spring is calculated to be 472 N/m according to the formula, $k=(2\pi f)2\cdot(m+\delta m)$; since the design amplitude of the mass block 1 is ±300 mm, the spring static elongation is calculated to be 492 mm according to Formula (4). Then the equivalent density of the mass is obtained by Formula (3), and thereby the ratio of the equivalent density of the mass block 1 to the density of the damping liquid 5 is 1.13:1. Subsequently, both the damper frequency and the damping ratio are actually measured to be 0.113 Hz and 10.5% respectively, which basically meets the design requirements and determines the design scheme. If the design requirements need to be further refined, Formula (2) can then be used to change the shape of the mass block 1 or adjust the damping ratio.

The following is a comparison between this example and the design scheme of the conventional TMD.

TABLE 2

Design parameter comparison between the present invention example and the conventional TMD

| Item | The present invention (①) | Conventional TMD (②) | Comparison (①/②) |
|---|---|---|---|
| Mass block (kg) | 200 | 200 | 1 |
| Total height (m) | 1.6 | >21 | 1/13.1 |
| Total length of the spring (m) | 0.8 | 19.9 | 1/24.9 |
| Total stiffness of the spring (N/m) | 472 | 100.8 | 4.7 |
| Number of springs | 4 | 4 | 1 |
| Medium diameter of the spring (mm) | 150 | 1200 | 1/8 |
| Diameter of the steel wire | 5 | 16 | 1/3.2 |

TABLE 2-continued

Design parameter comparison between the present invention example and the conventional TMD

| Item | The present invention (①) | Conventional TMD (②) | Comparison (①/②) |
|---|---|---|---|
| Equilibrium height of the spring (m) | 1 | 20 | 1/20 |
| Total mass of the spring (kg) | 5 | 402 | |

Based on the table above, if the active mass block 1 has the same frequency as the target frequency, the damper designed in the example for the present invention, compared to the conventional damper, shall have the total mass of the spring reduced to 1/80 of that of the conventional TMD and the total height of the damper reduced from more than 21 m for the conventional TMD to 1.6 m. The conventional TMD cannot meet the space demands from the existing long-span bridge girder, and therefore needs a complex lever-based structure. However, the TLMD in the present invention can be adapted to the on-site installation space requirements of the existing long-span bridges with a very simple structure.

The present invention is not limited to the above examples, and for those of ordinary skills in the art, several improvements and modifications can be made without departing from the principle of the present invention. These improvements and modifications are also considered to be within the protection scope of the present invention. What is not described in detail in this specification belongs to the prior art well-known to those skilled in the art.

The invention claimed is:

1. An ultra-low frequency (ULF) tuned liquid mass damper comprising:
    a damping box which is provided with a spring set secured at one end to the damping box, the other end connected with a mass block; wherein the damping box is filled with damping fluid, and the mass block is completely immersed or partially immersed in the damping liquid, the damping ratio of the ULF tuned liquid mass damper ranges from 3% to 35%, and the inherent frequency 0.05 to 0.5 Hz,
    wherein the upper portion of the damping box which is fixed with a connecting plate; the spring set is secured to the connecting plate.

2. The ULF tuned liquid mass damper as claimed in claim 1, wherein the spring set which comprises a first spring group located above the mass block and a second spring group opposite to the first spring group and located below the mass block, and the second spring group has one end connected to the bottom plate of the damping box.

3. The ULF tuned liquid mass damper as claimed in claim 2, wherein the spring set which is designed as a cylindrical spiral extension spring or a cylindrical spiral compression spring; the spring set is uniformly fixed above the mass block, or oppositely mounted to the top and the bottom of the mass block.

4. The ULF tuned liquid mass damper as claimed in claim 3, wherein the mass block is a solid structure or a hollow one.

5. The ULF tuned liquid mass damper as claimed in claim 4, wherein the mass block which has an overflow hole; the overflow hole is a through hole with its opening direction consistent with the axis of the spring set.

6. The ULF tuned liquid mass damper as claimed in claim 5, wherein the mass block is a streamlined body or a bluff body.

7. The ULF tuned liquid mass damper as claimed in claim 1, wherein the mass block which is provided with at least one set of flaps extending outwardly from the mass block; each flap set comprises two flaps disposed on opposite sides of the mass block.

8. A design method of the ULF tuned liquid mass damper as claimed in claim 1, comprising the steps of:
    Step 1: based on the vibration reduction goal, determining the mass (m) of the active mass block of the ULF tuned liquid mass damper, the target frequency (f) and the target damping ratio ($\xi$);
    Step 2: based on the amplitude and the space requirements of the ULF tuned liquid mass damper, determining the static deformation ($\delta$) of the spring;
    Step 3: based on the target damping ratio ($\xi$) determining the shape of the mass block initially;
    Step 4: based on the shape of the mass block and the frequency (f) test, determining the additional liquid mass ($\delta m$);
    Step 5: based on the formula, $k=(2\pi f)2\cdot(m+\delta m)$, determining the stiffness (k) of the spring set;
    Step 6: based on the formula, $m\cdot g=\rho\cdot g\cdot V+k\cdot\delta$, determining the equivalent density of the mass block;
    Step 7: measuring the frequency of the damper, and for a large deviation, adjusting it by changing the spring stiffness (k), and for a small one, adjusting it by changing the mass or the equivalent density of the mass block to achieve the required frequency (f) and static deformation ($\delta$);
    Step 8: measuring the damping ratio of the damper, and changing the shape or the clearance of the mass block to adjust the damping ratio when a deviation occurs;
    Step 9: repeating step 7 and step 8 until both the frequency and the damping ratio meet the requirements.

9. The design method as claimed in claim 8, wherein step 3 requires a bluff-body mass block with a large damping coefficient (CD) when the damping ratio ($\xi$) is large; or a streamline-body mass block with a small damping coefficient (CD) when the damping ration ($\xi$) is small.

10. A design method of an ULF tuned liquid mass damper, wherein the ULF tuned liquid mass damper comprising: a damping box which is provided with a spring set secured at one end to the damping box, the other end connected with a mass block; wherein the damping box is filled with damping fluid, and the mass block is completely immersed or partially immersed in the damping liquid, the damping ratio of the ULF tuned liquid mass damper ranges from 3% to 35%, and the inherent frequency 0.05 to 0.5 Hz;
    wherein the method comprises the steps of:
    Step 1: based on the vibration reduction goal, determining the mass (m) of the active mass block of the ULF tuned liquid mass damper, the target frequency (f) and the target damping ratio ($\xi$);
    Step 2: based on the amplitude and the space requirements of the ULF tuned liquid mass damper, determining the static deformation ($\delta$) of the spring;
    Step 3: based on the target damping ratio ($\xi$) determining the shape of the mass block initially;
    Step 4: based on the shape of the mass block and the frequency (f) test, determining the additional liquid mass ($\delta m$);
    Step 5: based on the formula, $k=(2\pi f)2\cdot(m+\delta m)$, determining the stiffness (k) of the spring set;

Step 6: based on the formula, $m \cdot g = \rho \cdot g \cdot V + k\rho\delta$, determining the equivalent density of the mass block;

Step 7: measuring the frequency of the damper, and for a large deviation, adjusting it by changing the spring stiffness (k), and for a small one, adjusting it by changing the mass or the equivalent density of the mass block to achieve the required frequency (f) and static deformation ($\delta$);

Step 8: measuring the damping ratio of the damper, and changing the shape or the clearance of the mass block to adjust the damping ratio when a deviation occurs;

Step 9: repeating step 7 and step 8 until both the frequency and the damping ratio meet the requirements.

11. The design method as claimed in claim 10, wherein step 3 requires a bluff-body mass block with a large damping coefficient (CD) when the damping ratio ($\xi$) is large; or a streamline-body mass block with a small damping coefficient (CD) when the damping ration ($\xi$) is small.

\* \* \* \* \*